No. 675,422. Patented June 4, 1901.
J. C. W. STANLEY.
TREATMENT OF COTTON SEED.
(Application filed Apr. 4, 1898.)
(No Model.) 2 Sheets—Sheet 1.
Fig. 1.
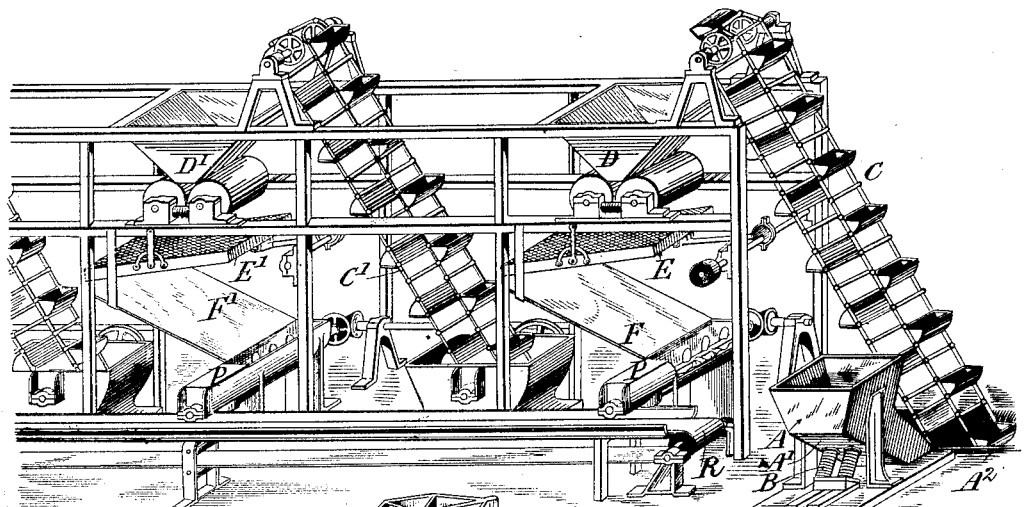
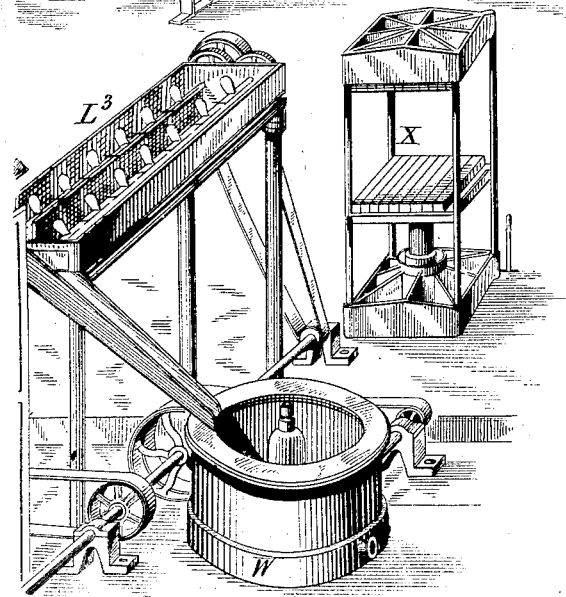
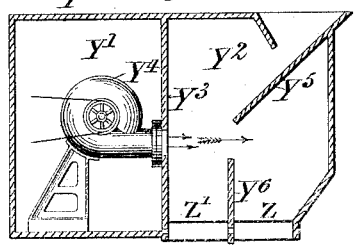
Fig. 2.

No. 675,422. Patented June 4, 1901.
J. C. W. STANLEY.
TREATMENT OF COTTON SEED.
(Application filed Apr. 4, 1898.)
(No Model.) 2 Sheets—Sheet 2.
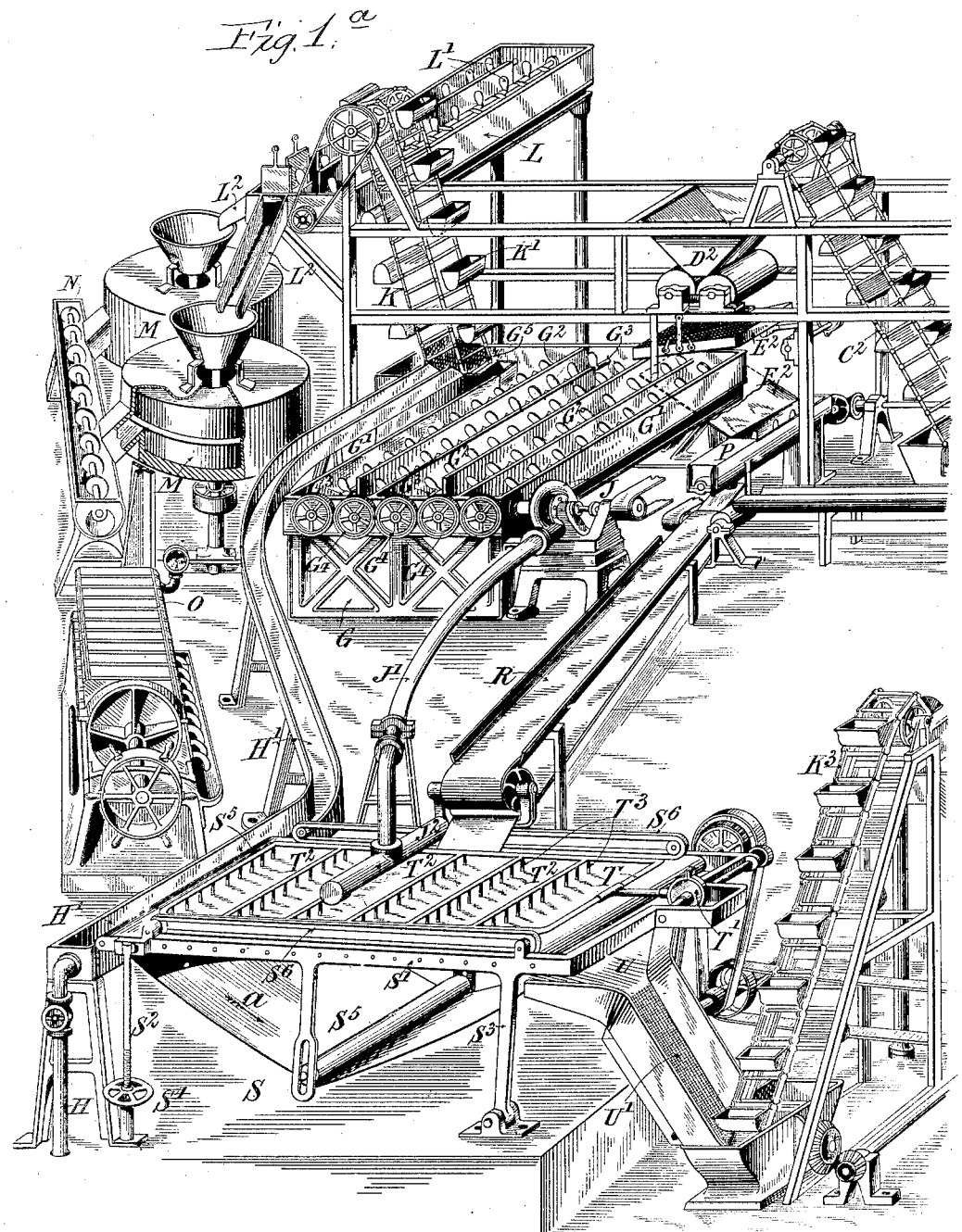

UNITED STATES PATENT OFFICE.

JOHN CHARLES WILLIAM STANLEY, OF LONDON, ENGLAND, ASSIGNOR TO THE COTTON SEED OIL SYNDICATE, LIMITED, OF SAME PLACE.

TREATMENT OF COTTON-SEED.

SPECIFICATION forming part of Letters Patent No. 675,422, dated June 4, 1901.

Application filed April 4, 1898. Serial No. 676,458. (No model.)

*To all whom it may concern:*

Be it known that I, JOHN CHARLES WILLIAM STANLEY, a subject of the Queen of England, residing at London, England, have invented certain new and useful Improvements in or Relating to the Treatment of Cotton-Seed, (for which I have made application for patent in England, No. 4,032, dated February 17, 1898,) of which the following is a specification.

This invention relates to the treatment of cotton-seed after it has been removed from the outer pod and has had the greater part of the cotton separated from it. It comprises a method whereby the kernel of the cotton-seed can be rapidly and readily separated from the hull and the separated kernels and hulls subsequently treated to produce cotton-seed-oil cake and pale cotton-seed oil. The oil-cakes are mainly composed of either crushed kernels unmixed with hulls or of hulls which have been finely divided while apart from the kernels, or a compound cake may be made from these hulls and the crushed kernels with or without the admixture of other material. The fine division of the separated hulls is of great importance, for by this means any cotton fibers which are attached to them are reduced to such a short length that when the hulls, either mixed with kernels or otherwise, are made into cakes these can be readily broken and assimilated by cattle or other stock, whereas cotton-cake with the long fibers of cotton left in has a most injurious effect upon the animals that eat it.

A further feature of importance in the present invention is the washing of the kernels and any small particles of hull which may adhere to them by water in such a manner that not only are the small adherent particles of hull separated from the kernels, but in addition the yellowish coloring-matter present in the kernels is washed out of them, so that they are left white, and consequently the oil subsequently extracted from them will be very much paler in color than if the oil had been obtained before this washing operation. The wash-water charged with the matter washed from the kernels can subsequently be treated by filtration, precipitation, or otherwise to enable the matter suspended therein to be recovered and the water used over again.

In the accompanying drawings, Figures 1 and 1ª together illustrate in perspective one arrangement of apparatus by which cotton-seed can be treated according to this invention. Fig. 2 is a vertical section of an alternative form of one of the machines illustrated in Fig. 1.

Like letters indicate like parts throughout the drawings.

The cotton-seed is placed in a hopper A, whence it passes through a chute A' and over the poles of an electromagnet B or other magnetic separator, which removes in a well-known manner any metallic impurities that may be mixed with it. The seed is delivered into a trough $A^2$, whence a bucket conveyer C takes it to crushing-rolls D, which deliver it onto a vibrating sifter E, through which some of the kernels separated from the hulls by the rolls D fall into a receptacle F. Those portions of the kernels which are too large to fall through the sifter E are delivered over its end, together with the hulls, to a second conveyer C', which takes them to another set of crushing-rolls D'. Here the process is repeated and the crushed seed fall upon a vibrating sifter E', through which some more of the kernels fall into a receptacle F'. The portions of the kernels which are too large to pass through the sifter E' are delivered over its end, together with the hulls, to a third conveyer $C^2$, working in conjunction with a third set of crushing-rolls $D^2$, vibrating sifter $E^2$, and receptacle $F^2$, where the crushing and sifting operations are again repeated. The hulls and any portions of kernel which may adhere to them are delivered over the end of the sifter $E^2$ to a washing-separator G, which comprises a tank G', divided by partitions $G^2$, so that there is a zigzag channel through it. In each division of the channel is a worm agitator $G^3$, the blades of which keep the charge of hulls constantly in motion and propel it along the channel. The worm agitators are so geared, as by the gear-wheels $G^4$, that they carry the charge up one division of the channel and down the next until it reaches the exit $G^5$. A stream of water, coming from a supply-pipe H and through a trough H', is admitted to the washing-separator G at the point G⁵ and traverses the zigzag channel made by the partitions G² in a direction opposite to that in which the charge of hulls is moving, keeping the agitators and the charge constantly submerged. Any portions of kernels which may have remained with the hulls are drawn out of the separator G with the stream of water by means of a pump J. The hulls, which are heavier than the kernels, are carried by the worm agitators to the exit G⁵, whence they are taken by a bucket conveyer K to a trough L, provided with worm circulators L', which deliver the hulls through chutes L² to grinding-mills M, in which the fibers of cotton adhering to the hulls are finely divided, as aforesaid.

Sometimes it may be found desirable to mix the hulls with Indian corn or other cereal before delivery to the grinding-mills to enable the rolls or stones to obtain a better grip on the material between them.

The buckets K' of the conveyer K are preferably perforated to allow the water to drain off from the hulls as they are carried to the trough L.

The hulls having been finely divided in the mills M are carried by a worm conveyer N to a filter-press O, where the moisture is extracted from them and they are pressed into cakes.

The portions of kernels from the receptacles F F' F² are carried by worm conveyers P to traveling bands R, which take them to a washing-separator S, comprising a table S', carried upon supports S² S³. The support S² is provided with a screw adjustment, as at S⁴, so that the inclination of the table with the horizontal may be varied. Upon the table S' an endless felt band S⁵ travels in the direction marked by the arrow $a$ in Fig. 1ᵃ. Deckle-straps S⁶ are provided at the sides of the band, and between the deckle-straps, above the top surface of the band S⁵, is a reciprocating stirrer T, moved from an eccentric T' and comprising a rectangular frame with cross-bars T², which are furnished with projections T³ on their under side.

The kernels are delivered by the band R onto the top of the band S⁵ at a point about midway in the length of the table S'. They are met by a stream of water coming from the washing-separator G by way of the pump J and pipes J' J². This stream of water brings with it the particles of kernels which were separated from the hulls in the washing-separator G, and these, with the main body of kernels brought by the bands R, are carried by the stream to the hopper U, one side U' of which is preferably perforated to allow the water to pass away. Any hulls which have passed through the sifters E E' E² with the kernels are carried by the band S⁵ against the stream of water to the trough H', where the water flowing from the supply-pipe H conveys them to the end G⁵ of the washing-separator G, at which point they join the main portion of the hulls and proceed to the grinding-mills M.

In the passage of the kernels through the washing-separator S they are washed, so that the adherent particles of hull and the coloring-matter in the kernels are both removed by the water, which becomes colored and drains away through the perforated portion U' of the trough and is afterward collected for further treatment, if desired.

The separated kernels pass from the hopper U, by means of an elevator K³, with perforated buckets and trough L³, which may be similar to the conveyer K and trough L previously described, to one or more centrifugal separators or driers W, wherein the excess moisture is extracted from them. The kernels after treatment in the centrifugal separators W are placed in oil-presses X, where the oil is extracted and the residue of the kernels pressed into cakes, or the kernels may be chemically treated for extracting the oil.

The pressed cakes from the oil-presses, which are mainly composed of crushed kernels, may be sold in that condition, or they may be led into mixers and combined with the finely-divided hulls, or cakes made therefrom, and finely pressed to produce a soft pressed cotton-cake containing both kernels and hulls; or, again, the mixing of the finely-divided hulls with the kernels may take place before either of them are pressed.

If desired, an air-separator Y, Fig. 2, may be used instead of the separator S. This air-separator may conveniently comprise a casing or box, divided into two compartments Y' Y² by a division Y³, and a blower Y⁴, which sends a blast of air in a horizontal direction through an opening in the division Y³. The sifted kernels, among which are a few hulls, are allowed to descend a chute Y⁵, at the bottom of which they meet the air-blast from the blower Y⁴. The kernels are carried over a partition Y⁶ onto a traveling band Z, while the hulls fall straight down and are carried away on another traveling band Z'.

It is obvious that when the kernels are treated in a washing-separator, such as S, the water used need not necessarily be that which comes from the washing-separator G, but may come from any other source. The arrangement illustrated in Fig. 1ᵃ is, however, found to be economical and convenient.

Although the use of a series of three crushers and sifters is hereinbefore described by way of example, a larger or lesser number may be used, and other variations can be made in the construction and arrangement of the apparatus without departure from this invention.

Having thus fully described my invention, what I claim, and desire to secure by Letters Patent, is—

1. The process herein described of treating cotton-seed, which consists in crushing the seed, separating the major portion of the kernels from the major portion of the hulls, causing said hulls to move against a current of water to separate adhering particles of kernel from such hulls, and conveying said particles of kernel away from the hulls, substantially as described.

2. The process herein described of treating cotton-seed, which consists in crushing the seed, separating the major portion of the hulls from the major portion of the kernels, washing said separated kernels to remove therefrom adhering particles of hulls, and conveying said hulls away from the kernels, substantially as set forth.

3. The process herein described of treating cotton-seed, which consists in crushing the seed, separating the major portion of the hulls from the major portion of the kernels, washing said kernels to separate adhering particles of hull therefrom, causing said hulls to move against a current of water to separate adhering particles of kernel therefrom, conveying all the hulls thus separated to a common receptacle and conveying all the kernels thus separated to a common receptacle, substantially as set forth.

4. The process herein described of treating cotton-seed, which consists in crushing the seed, separating the major portion of the hulls from the major portion of the kernels, washing said kernels to remove particles of hull and coloring-matter, freeing said washed kernels from excess moisture, and finally extracting the oil from such washed kernels, substantially as set forth.

5. The process herein described of treating cotton-seed, which consists in crushing the seed, separating the major portion of the hulls from the major portion of the kernels, washing said major portion of the kernels to separate adhering particles of hull therefrom, causing said major portion of the hulls to move against a current of water to separate adhering particles of the kernel therefrom, conveying all the separated hull to a common receptacle, reducing said hull to a finely-divided condition, conveying all the kernel to a common receptacle, freeing said kernel from excess moisture, extracting the oil therefrom, mixing the kernel-cake with finely-divided hull, and forming said mixture into cakes, substantially as set forth.

In testimony whereof I have hereto set my hand in the presence of the two subscribing witnesses.

JOHN CHARLES WILLIAM STANLEY.

Witnesses:
HAROLD WADE,
HARRY B. BRIDGES.